Oct. 21, 1941.   R. O. GRIFFIN   2,259,463

SELECTIVE FILING AND FINDING SYSTEM

Filed Jan. 28, 1939   6 Sheets-Sheet 1

INVENTOR.
ROBERT O. GRIFFIN
BY Munn, Anderson & Liddy
ATTORNEY.

Oct. 21, 1941.    R. O. GRIFFIN    2,259,463
SELECTIVE FILING AND FINDING SYSTEM
Filed Jan. 28, 1939    6 Sheets-Sheet 2

Fig. 2.

INVENTOR.
ROBERT O. GRIFFIN
BY Munn, Anderson + Liddy
ATTORNEY.

Fig. 4.

INVENTOR.
ROBERT O. GRIFFIN
BY Munn, Anderson + Liddy
ATTORNEY.

Oct. 21, 1941.  R. O. GRIFFIN  2,259,463
SELECTIVE FILING AND FINDING SYSTEM
Filed Jan. 28, 1939  6 Sheets-Sheet 5

INVENTOR.
ROBERT O. GRIFFIN
BY
ATTORNEY.

Patented Oct. 21, 1941

2,259,463

UNITED STATES PATENT OFFICE 2,259,463

SELECTIVE FILING AND FINDING SYSTEM

Robert O. Griffin, Berkeley, Calif.

Application January 28, 1939, Serial No. 253,334

17 Claims. (Cl. 129—16.1)

My invention relates to improvements in a selective filing and finding system, and it consists of the combinations, constructions and arrangements hereinafter described and claimed.

An object of my invention is to provide a selective filing and finding system that is an improvement over my Patent No. 2,134,715, issued November 1, 1938. In the patented device I show a selector designed to be removably attached to the side of a file drawer. A card or folder-holding device is mounted in the drawer and is raisable into a position where it may be rocked and will rock the selector therewith for causing the cards to move laterally toward the selector, the cards bearing the proper code moving further than the others and being removable from the drawer.

In the present invention, the card selector is incorporated into the cover of a box that carries the card container. The container is removable from the box and this permits containers with different sets of cards, to be acted upon by the device. In order to move the cards toward the selector for removing those cards having a predetermined code, I rotatably mount the box on a base and provide a handle for swinging the box and cover through one complete revolution. Novel means is used for causing the cover to vibrate toward and away from the box when the cover and box have been swung through substantially one-half a circle. The vibrating cover causes the cards to be agitated and this will prevent the cards from sticking together. An accurate selection of all of the cards bearing the same code will therefore be assured.

Since the cover is hinged to the rear of the box, it is difficult to remove selected cards from near the rear of the card container because the rear portion of the cover does not rise very high above the cards during the opening movement of the cover. To overcome this, I mount the cover hinge on spring pressed plungers that balance the weight of the cover. The springs are strong enough to raise the rear of the cover as the front of the cover is raised. This movement continues until the rear end of the cover is raised a considerable distance above the box. The selected cards disposed near the rear of the card container will therefore be lifted vertically a considerable distance by the upward moving cover before the cover will start to swing rearwardly. The sides of the box and cover are cut away to permit the selected cards to be viewed before they are entirely removed from the card container if it is so desired.

The card container is divided into compartments and it is possible to use the rearmost compartment for special coding purposes while preventing the cards in the other compartments from being acted upon. A special selector bar is used which will act as a stop for all of the cards with the exception of those in the last compartment. It is also possible to code both top and bottom edges of the cards and to select cards from either coded edge. The card container is made invertable for this purpose and may be mounted in the box with either of the card edges uppermost.

The machine also carries a card punch and this permits the card to be given a desired coding before being filed away in the card container. The card edges themselves are grooved to quickly show which one of the two coded edges is uppermost.

Other objects and advantages will appear in the following specification, and the novel features of the device will be particularly pointed out in the appended claims.

My invention is illustrated in the accompanying drawings forming a part of this application, in which.

Figure 2:
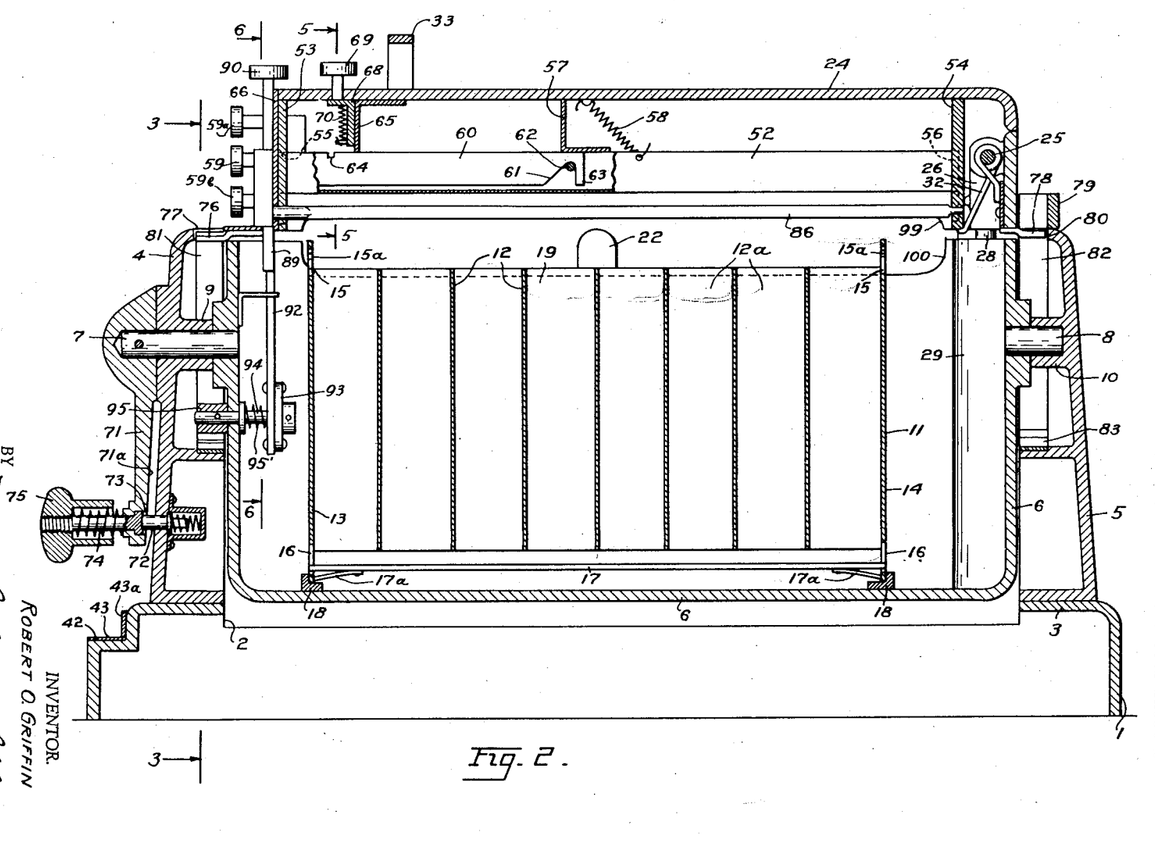
Figure 2 is a longitudinal section through the device.

In carrying out my invention, I provide a base indicated generally at 1, see Figure 2, and this base has a central opening 2 in its top 3. A casting 4 is mounted at the front end of the base and a second casting 5 is disposed at the rear end of the base. A box 6 carries a front trunnion 7 and a rear trunnion 8. The trunnion 7 is rotatably mounted in a bearing 9 formed in the casting 4, while the rear trunnion is rotatably mounted in a bearing 10 formed in the casting 5. The purpose of rotatably mounting the box 6 in the castings 4 and 5, will be described hereinafter.

Figures 7, 8, 9:
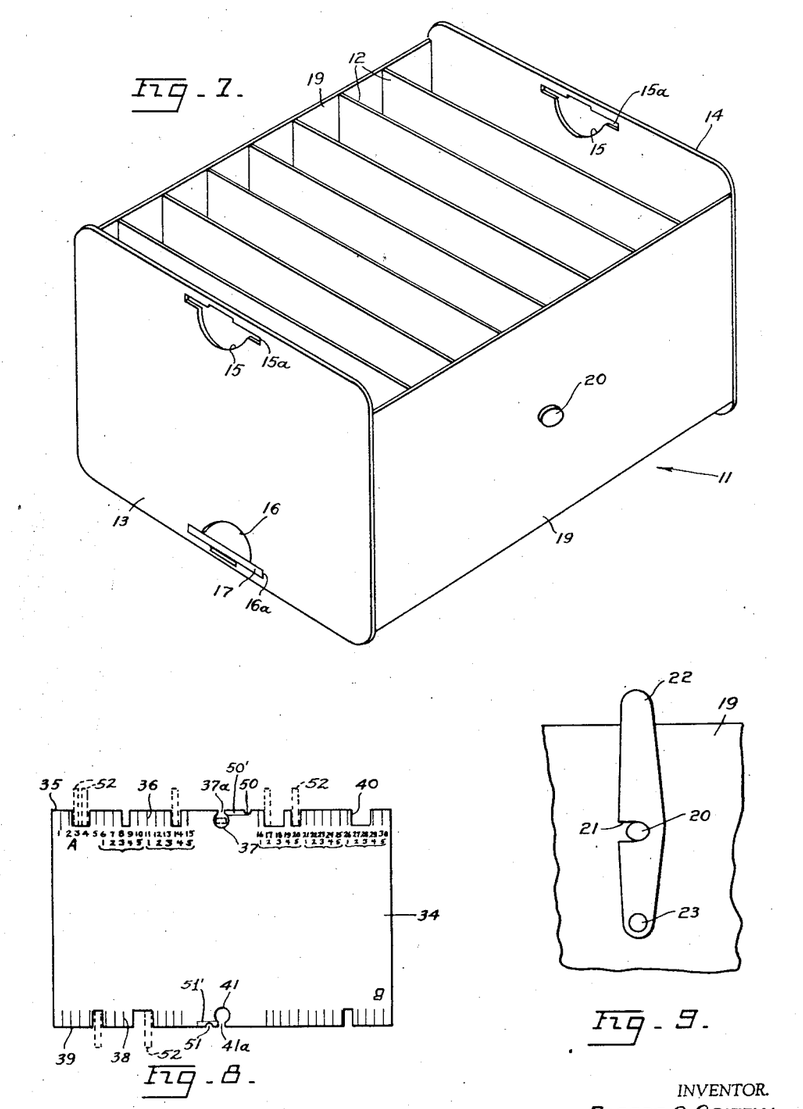
Figure 7 is an isometric view of the card-holding container.
Figure 8 is a plan view of one of the cards illustrating the operation of the device.
Figure 9 shows how the card container is removably secured in the box.

Within the box I removably dispose a card container 11. This card container is shown in an isometric view in Figure 7. The card container has partitions 12 separating the container into card-receiving compartments 12a. The front and back walls 13 and 14 of the container are provided with upper hand openings 15 and lower hand opening 16. Figure 7 shows the hand openings communicating with transversely extending slots 15a and 16a respectively. A bar 17 is inserted through the slots 16a and acts as a base for supporting cards 34 received in the card compartments 12a. Leaf springs 17a, see Figure 2, hold the bar 17 against accidental removal. The cards may be coded on their top and bottom edges. If it is desired to select cards from the lower coded edges, the container may be inverted. To accomplish this, a similar bar 17 may be inserted in the slots 15a and then the card container inverted whereupon the bar 17, which was formerly at the bottom of the container, may be removed.

The card container is removably secured in the box 6 and is held against longitudinal movement by angle members 18 that receive the ends 18 and 14, see Figure 2. The sides 19 of the card container carry projections 20, see Figure 9, that are received in notches 21 formed in levers 22. The levers are pivotally secured at 23 to the inner surfaces of the side walls of the box 6. The box is secured in place when the levers are swung into the vertical positions shown in Figures 2 and 9.

Figure 14:
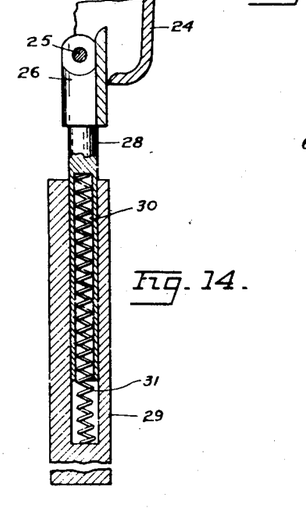
Figure 14 is a sectional view substantially along the line 14—14 of Figure 4.

The open top of the box 6 is closed by a cover 24. The cover is hinged to a rod 25, see Figure 2, and this rod is carried by a casting 26, see Figure 4. The rod 25 projects through the ends of the casting 26 and into bearings 27 that are integral with the cover 24. It is desirable to raise the rear end of the cover as the front is manually lifted. The purpose of this will be described later. To accomplish this, the casting 26 is supported by plungers 28 that are slidably mounted in cylindrical sleeves 29 formed in the box 6. In the detail showing in Figure 14, I show how each plunger 28 is provided with a bore 30 and receives a spring 31, the spring in turn bearing against the bottom of the sleeve or cylinder 29. The springs are strong enough to yieldingly urge the plungers 28 upwardly in the manner shown in Figure 4, when the cover 24 is swung into open position about its hinge rod 25 by an upward pull on handle 33. Two tortional springs 32 are mounted on the rod 25 and counter-balance the weight of the cover 24 so that it may be readily swung into open or closed position. The cover is moved into either of its two positions by means of a handle shown at 33 in Figure 2.

It is best now to described the type of card received in the card container and then to set forth the particular mechanism for setting up a code that will select all of the cards carrying the same code. One of the cards is shown at 34 in Figure 8. The edge 35 of the card is provided with thirty markings 36 arranged in two groups of fifteen each. The first group of fifteen markings is arranged to the left of a central recess 37, while the other group is arranged to the right of the same recess. The central recess 37 has a restricted neck portion 37a for a purpose hereinafter described. The card shown in Figure 8, is similar to the card shown in my co-pending application Serial No. 233,400, filed October 5, 1938. It is possible to provide markings 38 along the lower edge 39 of the card and in order to facilitate matters, the markings 36 are designated as the "A" side of the card and the markings 38 are designated as the "B" side of the card. It is possible to punch notches 40 in the edges 35 or 39 to follow a predetermined type of coding. The edge 39 of the card has a central recess 41 corresponding to the recess 37, and is provided with a restricted inlet 41a.

The card 34 can carry any desired information and the notches cut in the card, can be arranged in any predetermined manner as will be later described. It is possible to use a "Tumble head" form of card where the markings A will appear on one side of the card and the markings B will appear on the opposite side and also on the opposite edge. It is possible to arrange the markings A and B on the same side of the card as shown in Figure 8 and I call this type of card, "Rotating" form.

Figure 1:
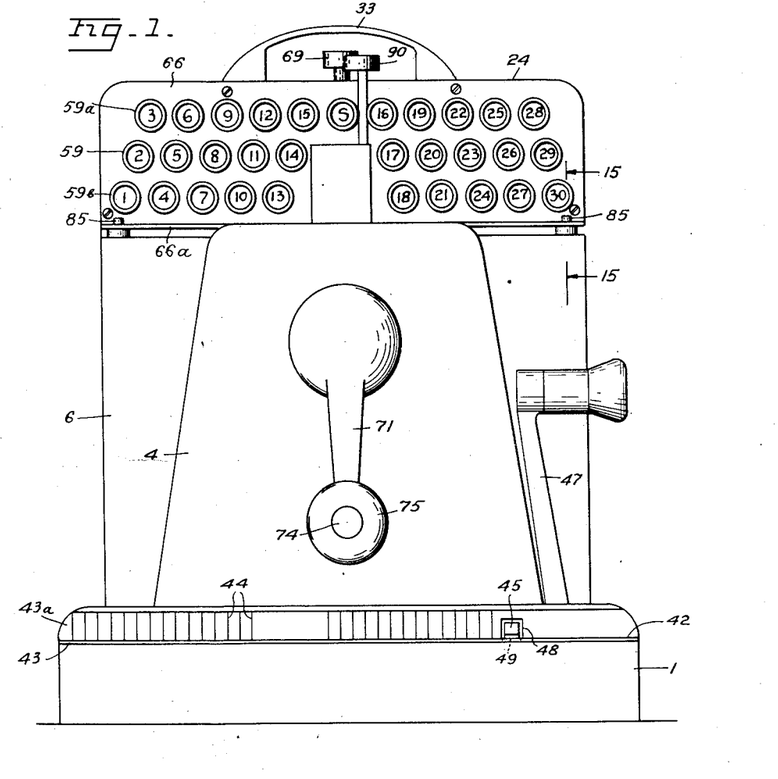
Figure 1 is a front elevation of the device.
Figure 3:
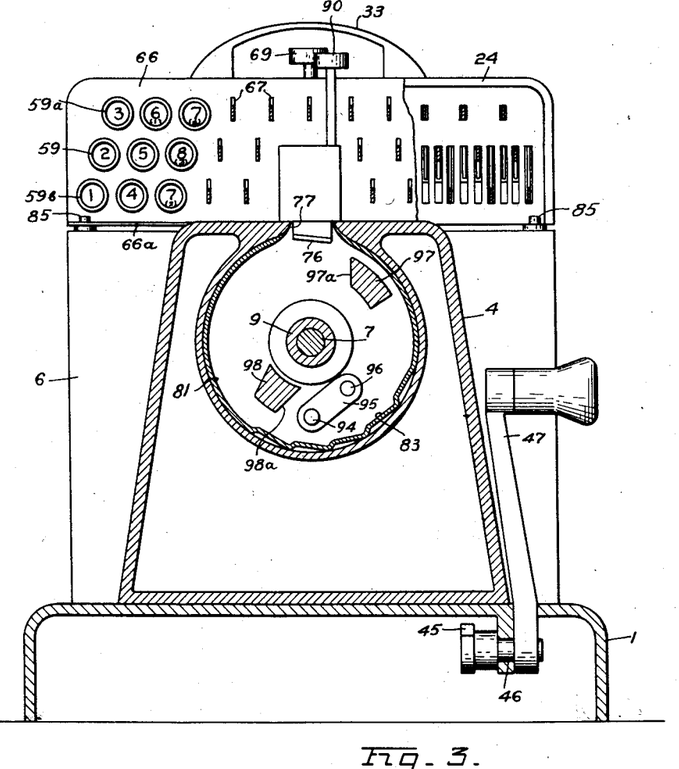
Figure 3 is a transverse section taken along the line 3—3 of Figure 2.

The machine has novel means for punching notches in the card or more of the thirty positions, and this mechanism is illustrated in Figures 1 and 3. The base 1 has a shelf 42 on which a scale 43 is mounted, this scale being provided with markings similar to the thirty markings on the edge of the card. The scale 43 has a vertical portion 43a also provided with similar markings 44. The markings on the card are numbered from one to thirty and likewise the markings on the scale 43 are similarly numbered. A punch 45, see Figures 1 and 3, is mounted on a shaft 46 and this shaft is rocked by means of a handle 47. The punch 45 extends through an opening 48 in the vertical portion 43a and when the handle 47 is swung forwardly, the punch is moved downwardly through a slot 49 in the shelf 42. A card placed on the scale 43 and under the punch 45 will have the notch 40 cut therein. It is possible to cut successive notches in the card and thus provide notches of greater width as shown in Figure 8, for particular coding purposes.

The edge 35 of the card is provided with a small notch 50 placed between the right hand group of markings 36 and the central recess 37. The edge 39 is provided with a similar small notch 51, but is spaced closer to the recess 41 than the spacing between the recess 37 and notch 50. The purpose of the small notches 50 in the cards, is to constitute an "eye guide" to permit the operator to quickly determine whether all of the cards in the bunch have their A side uppermost. If this is true, all of the notches 50 will be aligned with each other and will form a shallow groove extending parallel with the groove formed by the reduced neck portions 37a of the recesses 37. Should any one of the cards accidentally be inverted, the recess 51 would shown up at the top of the pack and would lie out of registration with the groove formed by the notches 50 and this could be quickly detected. Should the card happen to be turned around so as to bring the rear face of the card to the front, the notch 50 would then lie to the left of the recesses 37, and this could quickly be detected. In order to facilitate detection, the portion of the edge 35 of the card disposed just to the right of the recess 37 could be colored in a distinct manner, such as with red or blue, and this would aid the operator in more quickly detecting the error. One color could be used for the edge 35 and a different color for the edge 39, if desired, or both edges could be similarily colored. The colored portions are shown at 50' and 51'.

I will now describe the mechanism for selecting cards of a certain code and for removing these from the rest of the pack. The cover 24 carries a plurality of selector bars corresponding in number to the number of markings 36 or 38 on the cards 34. Each selector bar consists of a U-shaped member 52, see Figure 5, and this member extends between end guides 53 and 54. The guide 53 is disposed at the front of the cover 24 and has slots 55 for slidably receiving the U-shaped members 52. The ends of the slots limit the movement of the U-shaped selector bars toward and away from the cards in the card container when the cover is in closed position. The end guide 54 has grooves 56 corresponding in number and position to the slots 55. The U-shaped selector bars 52 are yieldingly held against an angle-shaped stop bar 57 by springs 58. One spring is provided for each bar.

The means for moving each selector bar 52 downwardly toward the card container comprises a key 59, having a key shank 60, see Figure 2, and the shank has a cam edge 61 designed to ride over a pin 62 extending between the sides of the selector bar 52. A stop 63 is disposed at the inner end of the key shank 60 and limits the forward movement of the key head 59 away from the wall of the cover 24. When it is desired to depress the selector bar 52 shown in Figure 2, the key 59 is moved inwardly and this will cause the cam edge 61 to ride on the pin 62 and to force the pin and the selector bar 52 downwardly as the key shank 60 slides under the angle bar 57. When the key shank 60 has completed its inward stroke, a notch 64 will align with the lower edge of a stop bar 65 and will receive the lower edge of the bar. This prevents the return movement of the key shank and therefore the selector bar 52 will remain in depressed position.

Figure 10:
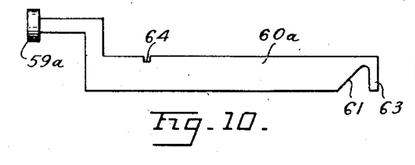
Figures 10, 11 and 12 illustrate different types of key bars.
Figure 11:
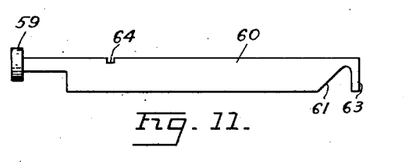
Figure 12:
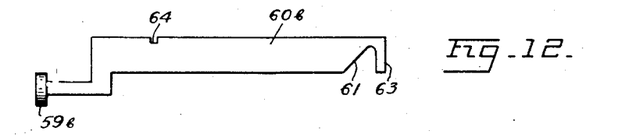

In order to provide sufficient room for thirty key heads 59 at the front of the machine, I provide three types of key shanks. The type shown in Figure 2 is also illustrated in Figure 11 and it will be noted that the key head 59 extends directly in front of the key shank. Certain of the key shanks will have their key heads disposed at a higher elevation, while others will have theirs disposed at a lower elevation. Figure 10 shows a key shank 60a similar to the shank 60, but provided with a key head 59a at a higher elevation. In Figure 12, a key shank 60b is provided with a key head 59b at a lower elevation. The key shanks 60, 60a and 60b are so arranged that the key heads 59a will form a top row of keys, see Figure 1, the key heads 59 will form a second row, and the key heads 59b will form a third row. In all other respects, the key shanks are identical to each other and operate in the same way.

In Figure 3, I show a front plate 66 as being provided with slots 67 through which the key shanks 60 slide. It will be noted that the key shanks are normally disposed at the bottoms of the slots, but when the keys are moved inwardly the springs 58 will act upon the selector bars and they in turn will act upon the key shanks for causing their outer ends to move upwardly in the slots 67 when the stop 65 receives the notches 64. If a wrong key is depressed, it is possible for the operator to free it by merely moving the key head 59 downwardly and this will free the notch 64 from the stop bar 65 and will permit the spring 58 to return the selector bar to starting position.

Figure 5:
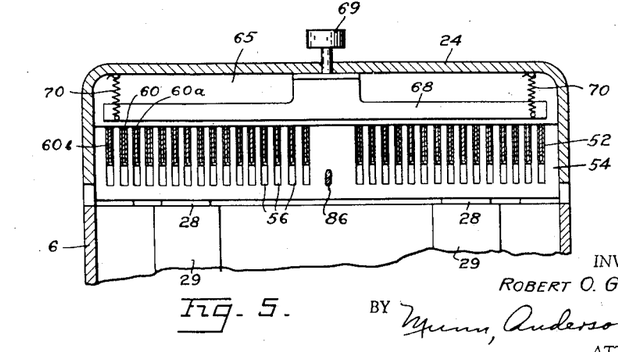
Figure 5 is a transverse section through the cover taken substantially along the line 5—5 of Figure 2.

I provide a simple means for freeing all of the selector bars and this comprises a release bar 68 slidable along the stop bar 65, see Figures 2 and 5. A button 69 projects through the top of the cover 24 and when this button is depressed, it will move the release bar 68 downwardly to free all of the key shanks from the stop bar 65 whereupon the springs 58 will return the selector bars to starting position. Figure 5 shows the release bar 68 supported by two springs 70 and the springs will return the bar to the position shown when the button 69 is freed.

It is best now to describe the manner of rotating the box and cover for the purpose of moving the cards against the selector bars, after which the construction of the catch bar and associated mechanism for separating the selected cards from the remaining cards will be explained. A handle 71 is connected to the trunnion 7 for rotating the box 6 and cover 24 about the trunnions 7 and 8. The handle 71 is held against accidental rotation by means of a spring-pressed pin 72, see Figure 2, that enters a recess 73 in the handle 71. Also, within this recess is the end of a spring pressed plunger 74 that in turn carries a knob 75. The operator in order to release the handle 71 from the pin 72 moves the knob 75 inwardly, and this will cause the pin 72 to be moved flush with the inner surface 71a of the handle. The handle will be freed from the pin by this movement and may be rotated.

I provide novel means for agitating the cover 24 as the cover and box are rotated. This will agitate the cards and free them from each other. The cover 24 when swung into closed position on the box brings a front cam follower 76, see Figures 2 and 3, into registration with an opening 77 in the top of the casting 4. A second cam follower 78 is mounted at the rear of the cover and is secured to the casting 26 that pivotally supports the cover. Care is taken that both cam followers 76 and 78 are in proper position before the box is rotated. The cam follower 78 enters a guide 79 mounted at the back of the box and this guide registers with an opening 80 in the casting 5, see Figure 4, the opening 80 corresponding to the opening 77 in the casting 4. Each casting 4 and 5 has a cam-shaped runway and these are numbered 81 and 82 respectively. Since both cam runways are identical, a description of the one shown at 81 in Figure 3, will suffice for both. Each runway has steps or drops shown at 83 and arranged at a predetermined point on the cam surface to cause the cam followers 76 and 78 to bump over the drops and thus jar the cover 24 as it is being rotated. This jarring movement will in turn cause the selector bars to agitate the cards and thus loosen them sufficiently so that they will move toward the selector bars freely. It will be noted from Figure 3 that the bumping action occurs only when the cover 24 is in an upsidedown position. After the handle 71 has made one complete turn, the pin 72 will be received in the recess 73, and the box will be again locked against further rotation.

Figure 4:
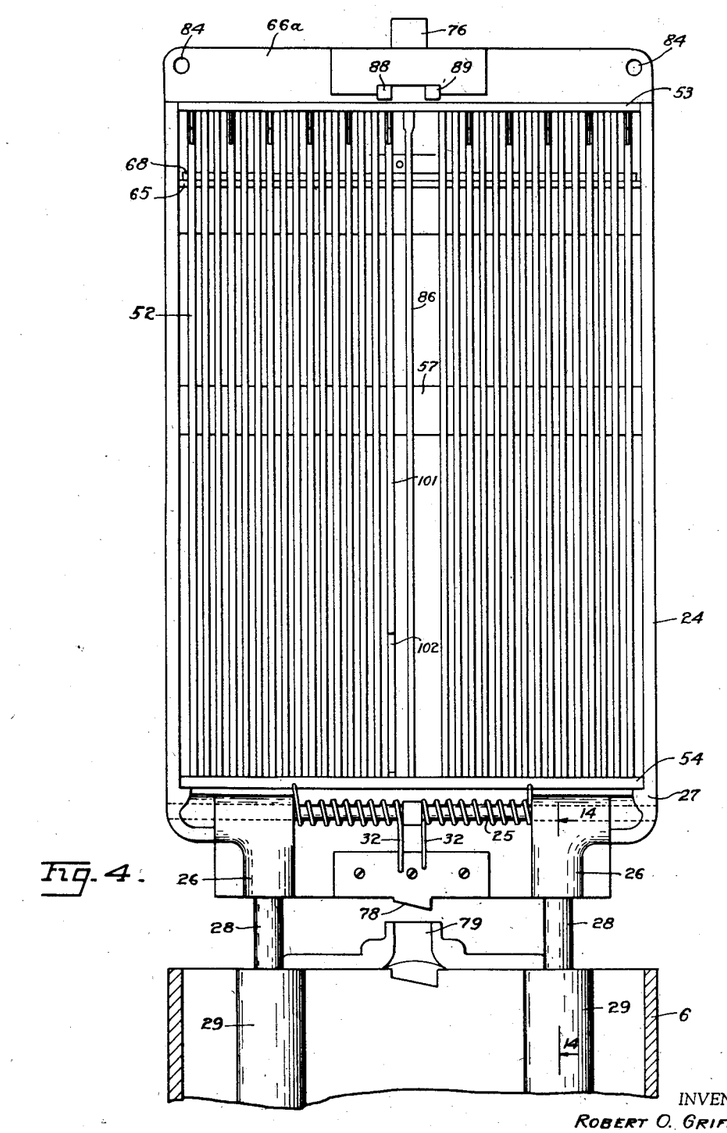
Figure 4 is a transverse section through the top portion of the box, showing the cover raised into a vertical position.
Figure 15:
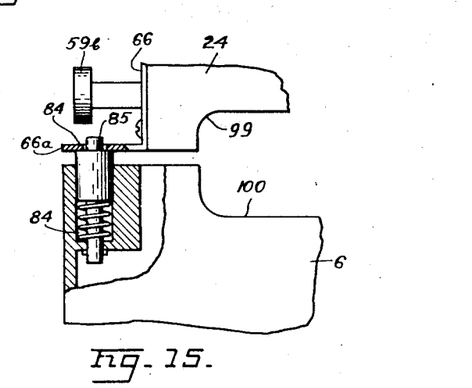
Figure 15 is a section substantially along the line 15—15 of Figure 1.

It should be mentioned at this point that the two front corners of the cover are provided with openings 84 that are designed to receive pins 85 carried by the box 6. Figures 3, 4 and 15 illustrate this construction. The front plate 66 of the box has a forwardly extending flange 66a in which the openings 84 are provided. The pins 85 are spring-pressed and are yieldingly held in the openings 84, as clearly shown in Figure 15. The pins 85 prevent any lateral movement of the cover with respect to the box 6 during the rotation of the box and the cover.

I provide novel means for gripping the cards whose notches 40 agree with the code set up by the selector bars, and for removing them from the remaining cards when the box completes its rotation. A catch bar 86, rectangular in cross section and with rounded edges, is centrally disposed in the cover 24, see Figure 4, and is positioned at a lower point than the initial positions of the selector bars 52. The catch bar is rotatably mounted in the end guides 53 and 54 and carries a pinion 87 at its front end, see Figure 6. The pinion meshes with two racks 88 and 89 and the rack 89 is extended upwardly to carry an actuating button 90. Both racks are connected to two integral arms 91 and 92 which in turn are pivotally connected to a lever 93. Figure 2 shows how the lever 93 is mounted on a stub shaft 94 so as to turn therewith. A spring 95' frictionally bears against the lever 93 for yieldingly holding the lever in the position into which it has been swung.

Figures 6, 17:
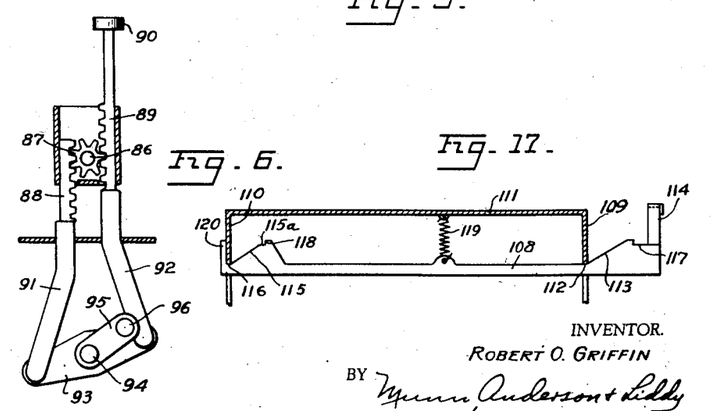
Figure 6 is a section substantially along the line 6—6 of Figure 2.
Figure 17 shows a modified form of selector bar.

Automatic means is provided for rotating the catch bar 86 so as to present its narrow edge to the card recesses 37 in case the bar is not already in the proper position. Figures 2 and 6 show the shaft 94 as carrying an arm 95 on which a roller 96 is mounted and this roller is adapted to engage with cams 97 and 98 as the box is rotated through one complete revolution. The cams 97 and 98 are carried by the casting 4. When the box is in normal position, the arm 95 will be in the position shown in Figure 3, if the catch bar 86 is in the dotted line position shown in Figure 8. When the box is now rotated, the roller 96 will first engage with the cam edge 98a of the cam 98 and will be swung in a clockwise direction and will cause the shaft 94 to also swing clockwise. This movement will raise the rack 88 and lower the rack 89 for causing the pinion 87 to rotate the catch bar 86 and position the narrow width of the bar in registration with the card recesses 37. The catch bar is now ready to receive any cards that are selected and the operation has taken place before the cards have had an opportunity to move toward the cover 24. If the catch bar should already be in proper position, the roller 96 would clear the cam edge 98a. The box is now rotated and the cover is caused to vibrate during the rotation by the cam steps 83 and this will agitate the cards and permit the selected cards to move further than the nonselected cards. The catch bar 86 will enter the recesses 37 of the selected cards because these cards will move further. At this moment, the arm 95 will carry the roller 96 against a cam edge 97a of the cam 97 which will swing the arm 95 and the shaft 94 in a counter-clockwise direction. This will move the racks 88 and 89 into the positions shown in Figure 6 and will swing the catch bar 86 through an angle of 90°, the catch bar now assuming the dotted line position shown in Figure 8. The opening of the cover 24 will now raise the selected card. The cards may be released from the catch bar after the cover 24 is opened, by depressing the button 90.

It has been stated that the springs 31 are strong enough to raise the rear end of the cover 24 as soon as the operator starts to raise the handle 33 to open the cover. The upward movement of the rear end of the cover will carry the cam follower 78 into the guide 79 and the raising of the cover by means of the handle 33 will carry the cam follower 76 out through the opening 77. It will be noted that the sides of the cover are cut away at 99, see Figure 2, and also the top sides of the box 6 are cut away at 100. When now the cover is raised slightly by means of the springs 31, this opening along the sides of the box will be increased and will permit the cards to be checked from the side of the box without the necessity of swinging the cover into open position. This obviates the necessity of entirely removing the selected cards from the others and obviates the necessity of refiling the cards in their proper places in the compartments 12a should an alphabetical or numerical system of filing be used. The tortional springs 32 are just strong enough to counter-balance the weight of the cover. The end guide 54, see Figure 2, may strike against the casting 26 when the cover is in a horizontal position and this will prevent the cover from swinging below a horizontal position.

Figure 13:
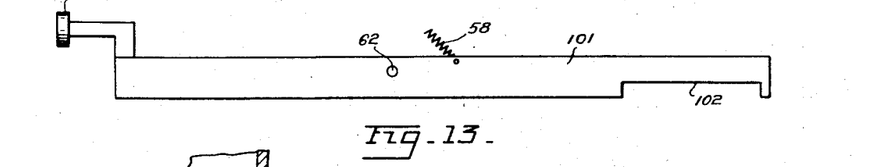
Figure 13 shows a special type of key bar.

It is difficult to remove cards from the rear compartment 12a unless the rear of the cover is moved upwardly and it is for this reason that the cover is mounted on the spring-pressed plungers 28. It is possible to use the rear compartment for a further classification and to accomplish this I provide a special selector bar shown at 101 in Figures 4 and 13. This bar is identical in construction to the others except that it has a recess 102 cut in its underside at a point where this recess will overlie the rear compartment 12a when the cover is in closed position. The key shank button for this particular selector bar 101 is given a different designation from the other keys. For example, the letter "S," see Figure 1, may be used and this will denote "Special bar."

When this bar is depressed, it will prevent all cards excepting those in the rearmost compartment 12, from moving into engagement with the catch bar even though the code set up by the selector bars correspond with the notches in the cards. The cutaway portion 102 in the special bar 101 will permit the cards in the compartment 12a to move toward the selector bars and certain of the cards whose notches agree with the selector bar combination, will be selected. The device is operated in the usual manner and when the cover 24 is raised, the catch bar 86 will only remove those cards from the rearmost compartment 12a that have the proper coding. It has already been stated that the card container 11 may be interchanged from the bottom to the top of the container and then the container reinserted in an upsidedown position for permitting coding to be made from the edges 39 of the cards.

Operation

The cards are coded in any predetermined manner and then placed in the desired compartments 12a. The card container is then disposed within the box 6 after which the cover is closed. Care is taken that the cover is in such a closed position that the cam followers 76 and 78 will be received in the openings 77 and 80. Any desired code may now be set up by pressing certain of the keys 59, 59a and 59b. The knob 75 is moved to release the stop pin 72 from the arm 71 and the arm is rotated through one complete revolution. The cam followers 76 and 78 will ride on the cam runways 81 and 82 and will keep the cover 24 closed. The cam followers will also bump over the steps 83 in the cam runways 81 and 82, and this will cause the cover 24 to move toward and away from the box 6 a number of times. The springs 31 and the spring-pressed pins 85 will permit the cover to move toward and away from the box during the rotation of the box. The cards will be vigorously shaken and those that have notches corresponding with the depressed selector bars will move to a position where the catch bar will enter the recesses 37. During the rotation of the box and cover, the catch bar will be first rotated to enter the recess 37, if this is necessary, and then rotated to prevent the removal of the cards from the catch bar. A lifting of the cover will now carry with it the selected cards.

Figure 16:
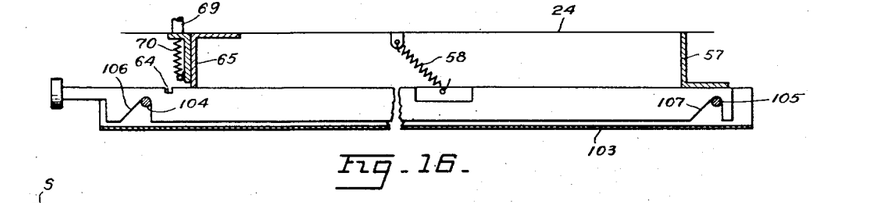
Figure 16 illustrates a modified form of key bar.

In Figure 16, I show a slightly modified form of selector bar in which the U-shaped bar 103 carries a front pin 104 and also a rear pin 105, both corresponding with the pins 62. Two cam edges 106 and 107 ride on the pins 104 and 105 and this will cause the bar 103 to be uniformly moved downwardly at both ends regardless of the length of the bar. In all other respects, this modified form is identical to that shown in Figure 2 and corresponding reference numbers will be supplied.

If it is desired to use a single selector bar rather than the U-shaped bars and key shanks, the form shown in Figure 17 may be used. The selector bar is shown at 108 in this drawing and extends from the front wall 109 to the rear wall 110 of a cover 111. The bar 108 projects through a slot 112 in the front wall and has an inclined cam edge 113 designed to move the bar downwardly in the slot when the front 114 of the bar is moved toward the box. The bar also has an inclined cam 115 that engages with the upper edge of a slot 116 in the rear wall of the cover. A rearward movement of the bar will cause the edges 113 and 115 to move the bar downwardly until the upper edge of the slot 112 enters a notch 117 in the bar. When this point is reached, the upper edge of the slot 116 will have contacted a straight portion 115a of the cam 115. A stop 118 prevents further movement.

The bar is released by pressing downwardly on the member 114 and a spring 119 will move the bar forwardly and upwardly until a rear projection 120 on the bar contacts with the rear of the cover. This type of bar will be uniformly moved downwardly at both ends regardless of the length of the bar.

*Explanation of coding system used with the device*

The system of coding that can be used with the device is such that the desired records are obtained in one operation of the machine, rather than by two or more re-sorts as is frequently necessary in the code combinations usually employed in the "knitting needle" methods. It is true, however, that with the other type of code, the maximum number of combinations with a small number of positions is larger; hence, if the given problem requires it, such a coding can be adapted to use by my machine just as well as it is employed in the "knitting needle" systems. I will consider only the system by which a certain number of positions on one or more of the four margins of the cards are reserved for coding certain classifications of facts. Within such positions, notches will be cut, depending upon the total number of possibilities within the range of choice or necessity and the maximum number of such combinations will always be provided by cutting half as many notches as there are positions reserved e. g., if there are ten positions, each coding will be cut in five notches, thus providing a total range of 252.

Later on I will show lists of figures indicating the coding necessary to obtain various maximum numbers of "breakdowns" of an index file by given factors. This type of coding, just as in any other, can be used only for a type of factor in which there can be but one choice such as location in time or place of an occurrence or object; e. g., day of the month or year, street address or other geographical location, serial number, race, year or period of birth, etc. It cannot be used when there may be several entries under the one general classification for the same individual subject; e. g., crime in a criminal record file; in which case, any criminal of importance, while perhaps specializing in one type of crime, nevertheless has a record for the commission of two or more types of crime such as robbery as well as burglary, larceny as well as forgery, etc. In this and similar cases, each such item must be given an individual notch position on the card margin.

This, of course, means that the maximum number of cross-references possible to be had on one or both of the long margins of a card is seriously limited when they are used up at the rate of one for each factor. On the other hand, if there is only one or two or a few general factors, in each of which group there can be but one choice, there is almost no practical limit to the number of "breakdowns" that can be had. For instance, assuming that the only thing necessary or desired to code is a serial number: on one side of the card with thirty positions, the total number of serial numbers that could be coded (by combinations of fifteen notches) would be 115,117,520—much more than enough for all practical purposes.

However, in indexing serial numbers, (since in most instances indexing is carried out only to three or four digits) the more practical method is to divide the thirty positions into six segments; one set of five for each digit position up to six figures. This type of coding is set forth in my co-pending application, Serial No. 233,400. In any one such digit position, the code would always be as follows: positions one and two would signify the figure 1; one and three, 2; one and four, 3; one and five, 4; two and three, 5; two and four, 6; two and five, 7; three and four, 8; three and five, 9; four and five, 0. In using this arrangement, there will always be two positions cut in each one of the segments of five, depending upon the digit position to which the file is indexed; that is, if a file is indexed according to the last four digits of the serial numbers of the objects therein indexed, then in each of the last four segments of five, there will be two positions notched, or a total of eight notches, even though the whole serial number in one case might be just 1, in which event the pairs of positions cut would be 4—5, 4—5, 4—5, 1—2. Likewise, of course, in selecting the coded card, keys corresponding to the code on the card would be set up in the machine except in a case such as where the complete serial number (as in license numbers of automobiles) might not be known and in such a case, and peculiarly provided for by this system of coding, various combinations with the known figures could be tried.

There is one other peculiar advantage of this system which is here suggested: it is ideally adapted to a decimal system of indexing. The decimal index is worked out as for any index card cataloging and translated by notching onto the card in the manner above described, which makes it possible to sort by any group or subgroup or combination thereof. An ideal application is Dr. Logie's Standard Nomenclature for cataloging diseases in hospitals and physicians' offices.

Now getting back to the following columns already referred to, it will be noted that the same or approximately the same number of individual codings is obtainable within segments of different lengths depending upon the number of positions cut. This makes it possible to exercise discretion as to which will be used. For instance, if it is not necessary to extend the "breakdown" so as to tax the capacity of one or both long margins, but merely to code one or two factors for which the multiple combination principle can be used, labor can be saved by cutting combinations of fewer positions with a larger segment. As an example, if it were only desired to use the file to classify locations by 100 districts, this could be accomplished by reserving nine positions to be cut in combinations of four, which would give a maximum of 126; ten positions in combinations of three, which would give a maximum of 120; or fifteen positions in combinations of two, which would give a maximum of 105. If none of the fifteen positions on the card were needed for something else, then the logical choice would be to reserve all fifteen solely for that "breakdown" of 100 districts, since there would be much less labor in the long run in cutting two notches to designate any one of the 100 districts than if a smaller segment were used, necessitating the cutting of three or more notches for each district.

It will be apparent from what has already been said that extreme care must be given to the whole coding problem so far as it appears at the time the system is installed, as well as what may be desired over a long period of expansion. With this in mind, the following table of figures is arranged below in two columns; the left hand column showing the progressive order of number of positions reserved on the card with the total number of combinations possible varying according to the number of notches cut within the reserved positions; the right hand column showing the total number of combinations possible in progressive ascending order and illustrating the various number of positions it is necessary to reserve and the number of notches which must be cut in the reserved section.

One further fact must be kept in mind and that is whatever combination is decided upon, it must be adhered to; in other words, as long as the cards are kept in the one tray, you cannot cut two notches in a reserved section at one time, and later on cut three or more notches in the same section. Using the case of the 100 districts, if it is decided to use fifteen positions cut in combinations of two, to give 105 possible combinations, then two notches must always be cut in the card and in the same reserved section. If it later develops that instead of 100 districts it is desired to provide for 200, you cannot decide to cut three positions within ten reserved positions (which would give 210) unless a new file is started.

In the following two columns of figures, the first figure in both columns indicates the number of positions reserved on the card; the figure in the parentheses indicates the number of notches cut in the reserved position; and the final figure indicates the greatest number of combinations possible which result.

| | | | |
|---|---|---|---|
| 4 (2) | 6 | 4 (2) | 6 |
| 5 (2) | 10 | 5 (2) | 10 |
| 6 (2) | 15 | 6 (2) | 15 |
| 6 (3) | 20 | 6 (3) | 20 |
| 7 (2) | 21 | 7 (2) | 21 |
| 7 (3) | 35 | 8 (2) | 28 |
| 8 (2) | 28 | 7 (3) | 35 |
| 8 (3) | 56 | 9 (2) | 36 |
| 8 (4) | 70 | 10 (2) | 45 |
| 9 (2) | 36 | 11 (2) | 55 |
| 9 (3) | 84 | 8 (3) | 56 |
| 9 (4) | 126 | 12 (2) | 66 |
| 10 (2) | 45 | 8 (4) | 70 |
| 10 (3) | 120 | 13 (2) | 78 |
| 10 (4) | 210 | 9 (3) | 84 |
| 10 (5) | 252 | 14 (2) | 91 |
| 11 (2) | 55 | 15 (2) | 105 |
| 11 (3) | 165 | 10 (3) | 120 |
| 11 (4) | 330 | 16 (2) | 120 |
| 11 (5) | 462 | 9 (4) | 126 |
| 12 (2) | 66 | 17 (2) | 136 |
| 12 (3) | 220 | 18 (2) | 153 |
| 12 (4) | 495 | 11 (3) | 165 |
| 12 (5) | 792 | 19 (2) | 171 |
| 12 (6) | 924 | 20 (2) | 190 |
| 13 (2) | 78 | 10 (4) | 210 |
| 13 (3) | 286 | 21 (2) | 210 |
| 13 (4) | 715 | 12 (3) | 220 |
| 13 (5) | 1,287 | 10 (5) | 252 |
| 13 (6) | 1,716 | 23 (2) | 253 |
| 30 (15) | 155,117,520 | 30 (15) | 155,117,520 |

Since practical usage would rarely require it, the foregoing process has been stopped far short of developing the possibilities even on one side of the card (except to show the maximum) without continuing it onto any other margin of the card. Using all sixty positions on the two eight inch margins on a 5" x 8" card, cut in combinations of thirty, as an extreme example, the number of possible combinations would run into astronomical figures.

While I have shown only the preferred form of my invention, it should be understood that various changes or modifications may be made within the scope of the appended claims without departing from the spirit of the invention.

I claim:

1. In combination, a container for carrying cards notched along an edge according to a predetermined code, a card selector arranged adjacent to the notched edges and carrying selector keys, said keys being movable toward the cards to effect different code combinations, means for rotating the container and selector for moving the cards toward the selector, whereby cards having notches corresponding to the depressed keys will move further than the remaining cards, and means for gripping the selected cards preparatory to removing them.

2. In combination, a container for carrying cards notched along an edge according to a predetermined code, a card selector arranged adjacent to the notched edges and carrying selector keys, said keys being movable toward the cards to effect different code combinations, means for rotating the container and selector for moving the cards toward the selector, whereby cards having notches corresponding to the depressed keys will move further than the remaining cards, means for gripping the selected cards preparatory to removing them, and means for agitating the cards during the rotation of the container for aiding in selecting the properly coded cards.

3. In combination, a container for cards that are notched, a card selector disposed adjacent to the notched edges of the cards and including selector keys movable toward the cards, means for moving the container through a complete rotation for causing the cards to move toward the selector keys, whereby cards having notches corresponding to the depressed keys will move further than the remaining cards, the selector keys holding the cards against falling out of the container during rotation of the latter, and means for gripping the selected cards.

4. In combination, a container for notched cards, a card selector disposed adjacent to the notched card edges and constituting a cover for the container, means for moving the container for causing the cards to move toward the selector, means carried by the selector for removing the selected cards, and means for raising the selector for removing the selected cards.

5. In combination, a container for notched cards, a card selector normally overlying the container and constituting a cover therefor, means securing the selector to the container with freedom of a limited movement toward and away from the container, means for rotating the container and selector for moving the cards toward the selector, means for agitating the selector during this rotation for causing the cards having notches agreeing with the selector combination, to move further than the remaining ones, and means for gripping the selected cards during the rotation of the container.

6. In combination, a card container for receiving notched cards, a cover for the container, a hinge supporting the cover and being movably carried by the container so that the cover can be moved toward and away from the container, spring means for balancing the cover weight and for raising the cover hinge when the cover is lifted, a card selector carried by the cover, means for rotating the container and card selector as a unit, means for securing the cover to the container during this rotative movement, card gripping means for gripping the selected cards during the rotation of the container and cover, said card gripping means being carried by the cover and raising the selected cards from the container at the completion of the rotative movement and when the cover is swung upwardly, said spring means also raising the hinge during this movement.

7. In combination, a card container for receiving notched cards, a card selector including selector keys overlying the container, cards placed in the container and each having a recess with a restricted opening, a card removing member adapted to enter the card recess when the member is in one position and to engage with the card when the member is in a different position, means for rotating the container and selector through a complete revolution for causing the cards to move toward the selector, the cards having notches corresponding to the code set up by the selector keys moving further than the remaining cards and receiving the keys in the notches, said card removing member entering the recesses of the furtherest moved cards, and means for moving the member into its second position before the container completes its rotation for causing the member to grip the cards selected.

8. In a device of the type described, a card container for receiving notched cards, a card selector disposed adjacent to the notched card edges, cards placed in the container and having recesses with restricted openings, a card removing member adapted to enter the recesses when the member is in one position, means for rotating the container and selector for moving the cards toward the selector and member, automatic means for positioning the member to enter the recesses prior to the movement of the cards toward the selector, means for turning the member to grip those cards selected by the selector, said member remaining in its card gripping position at the completion of the container rotation, whereby a removal of the selector from the container will carry the selected cards therewith.

9. In a device of the type described, a rotatable card container, a selector rotatable with the container, cards mounted in the container and having notches that cooperate with the selector for permitting the selected cards to move into a predetermined position during the rotation of the container, a card gripping member adapted to grip the selected cards during the rotation of the container, and manually controlled means for causing the gripping member to free the selected cards.

10. In a device of the type described, a rotatable card container, a card selector movable toward and away from and constituting a cover for the container, spring guides permitting this movement between the container and selector, means for holding the cover in closed position during the rotation of the container and selector, means for gripping the selected cards separated from the remaining cards by the selector, certain of the spring guides being hinged to the selector and moving the hinge away from the container as the selector is swung into open position, whereby the initial movement of the selected cards when being removed will be in a plane paralleling the plane of the cards.

11. In a device of the type described, a card container, a cover over the container, the cover having depending sides, a card selector and gripper overlying the container and carried by the cover, the side walls of the container and the depending sides of the cover being cut away for permitting the cards to be viewed, and yielding means for supporting the card selector at different elevations above the container for exposing varying portions of the gripped cards above the remaining cards.

12. In a device of the type described, a card selector comprising a frame, selector keys carried thereby and comprising U-shaped bars, key shanks slidably mounted in the U-shaped bars and having cam edges, pins carried by the bars and engaged by the cam edges for moving the bars when the key shanks are moved in a longitudinal direction, and means for locking the bars in operative position.

13. In a device of the type described, a card selector comprising a frame, selector keys carried thereby and comprising U-shaped bars, key shanks slidably mounted in the U-shaped bars and having cam edges, pins carried by the bars and engaged by the cam edges for moving the bars when the key shanks are moved in a longitudinal direction, means for locking the bars in operative position, said locking means consisting of a notch in the key shank and a stop, said key shank being freed from the stop when manually depressed, and spring means for returning the key shanks and bars back to starting position.

14. In a device of the type described, a card selector comprising a frame, selector keys carried thereby and comprising U-shaped bars, key shanks slidably mounted in the U-shaped bars and having cam edges, pins carried by the bars and engaged by the cam edges for moving the bars when the key shanks are moved in a longitudinal direction, means for locking the bars in operative position, and common means for releasing all of the keys simultaneously.

15. In a device of the type described, a rotatable card container having compartments for receiving notched cards, a card selector having card selecting bars adapted to enter the notches for selecting certain cards when the cards are moved toward the bars, and means for preventing cards in certain of the compartments from moving toward the bars.

16. In combination, a container for carrying cards notched along an edge according to a predetermined code, a card selector arranged adjacent to the notched edges and carrying selector keys, said keys being movable toward the cards to effect different code combinations, means for rotating the container and selector for moving the cards toward the selector, whereby cards having notches corresponding to the depressed keys will move further than the remaining cards, means for gripping the selected cards preparatory to removing them, and means for agitating the cards only during that portion of the rotation of the container in which the cards have been turned upside down and the selector is arranged beneath the cards, the agitation of the cards being sufficient to cause them to move toward the selector keys freely.

17. In combination, a container for carrying cards notches along an edge according to a predetermined code, a card selector arranged adjacent to the notched edges and carrying selector keys, said keys being movable toward the cards to effect different code combinations, means for rotating the container and selector for moving the cards toward the selector, whereby cards having notches corresponding to the depressed keys will move further than the remaining cards, means for gripping the selected cards preparatory to removing them, cam-shaped runways arranged at opposing ends of the container and having steps formed therein, the runways extending around the axis on which the container is rotated, and cam followers operatively connected to the container and movable over the runways for agitating the container and the cards during the rotation of the container for aiding in moving the cards toward the selector.

ROBERT O. GRIFFIN.